(12) United States Patent
Wu et al.

(10) Patent No.: US 11,327,322 B1
(45) Date of Patent: May 10, 2022

(54) HEAD MOUNTED DISPLAY DEVICE

(71) Applicant: HTC Corporation, Taoyuan (TW)

(72) Inventors: Chou-Wei Wu, Taoyuan (TW);
Ying-Chieh Huang, Taoyuan (TW);
Yen-Cheng Lin, Taoyuan (TW);
Tung-Ting Cheng, Taoyuan (TW);
Chun-Wei Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/206,132

(22) Filed: Mar. 19, 2021

(51) Int. Cl.
*H04R 1/10* (2006.01)
*G02B 27/01* (2006.01)

(52) U.S. Cl.
CPC ......... *G02B 27/0176* (2013.01); *H04R 1/105* (2013.01); *H04R 1/1008* (2013.01); *G02B 2027/0154* (2013.01); *H04R 2499/15* (2013.01)

(58) Field of Classification Search
CPC ...... H04R 5/033; H04R 1/105; H04R 1/1066; H04R 5/0335; H04R 1/10
See application file for complete search history.

(56) References Cited

U.S. PATENT DOCUMENTS

2016/0249124 A1* 8/2016 Drinkwater ............ H04R 1/105
2019/0280416 A1* 9/2019 Zhang .................... H01R 13/73

FOREIGN PATENT DOCUMENTS

CN 110308558 10/2019
TW 711314 11/2020

OTHER PUBLICATIONS

"Notice of allowance of Taiwan Counterpart Application", dated Jan. 28, 2022, p. 1-p. 5.

\* cited by examiner

*Primary Examiner* — Kile O Blair
(74) *Attorney, Agent, or Firm* — JCIPRNET

(57) ABSTRACT

A head mounted display device, including a main body, a headband component, two earphone components, and two driving modules, is provided. The headband component includes two opposite headband connectors. The two headband connectors are respectively rotatably arranged on two opposite sides of the main body along a first axis. The two earphone components respectively include two earphone connectors. The two earphone connectors are respectively rotatably arranged on the two sides of the main body along two parallel second axes, and the two earphone connectors are located beside the two headband connectors of the headband component. The two driving modules are respectively arranged between the two headband connectors and the two earphone connectors, and the two earphone connectors are linked to the two headband connectors. When the two headband connectors of the headband component rotate relative to the main body along the first axis, the two driving modules drive the two earphone connectors to rotate in opposite directions relative to the main body along the two second axes.

12 Claims, 7 Drawing Sheets

HEAD MOUNTED DISPLAY DEVICE

BACKGROUND

Technical Field

The disclosure relates to a display device, and more particularly to a head mounted display device.

Description of Related Art

With the increasing development of the technology industry, the types, functions, and usage manners of electronic devices are becoming more and more diversified. Wearable electronic devices that may be directly worn on the body of the user have also emerged accordingly. There are quite a few types of head mounted electronic devices. Taking the head mounted electronic device such as the eye mask as an example. After wearing such electronic device, the user can not only experience the display effects of virtual reality, augmented reality, and even mixed reality, but also listen to sound through the earphone module of the head mounted electronic device for some models.

However, in the existing manners of wearing a head mounted electronic device with an earphone module, the user often needs to flip open the earphone module first to prevent the earphone module from blocking the wear on the head of the user, and adjust the earphone module to be next to the ears of the user after wearing the head mounted electronic device. Alternatively, the user needs to push open the earphone module with his head, so that the ears of the user are next to the earphone module. Such manners have disadvantages of being unintuitive and inconvenient, which cause poor user experience.

SUMMARY

The disclosure provides a head mounted display device, which has better operation convenience.

The head mounted display device of the disclosure includes a main body, a headband component, two earphone components, and two driving modules. The headband component includes two opposite headband connectors. The two headband connectors are respectively rotatably arranged on two opposite sides of the main body along a first axis. The two earphone components respectively include two earphone connectors and two sound emitting parts far away from the two earphone connectors. The two earphone connectors are respectively rotatably arranged on two sides of the main body along two parallel second axes, and the two earphone connectors are located beside the two headband connectors of the headband component. The two driving modules are respectively arranged between the two headband connectors and the two earphone connectors, and the two earphone connectors are linked to the two headband connectors. When the two headband connectors of the headband component rotate relative to the main body along the first axis, the two driving modules drive the two earphone connectors to rotate in opposite directions relative to the main body along the two second axes, so that the two sound emitting parts are close to or far away from each other.

In an embodiment of the disclosure, each of the driving modules includes a first gear and a second gear meshed with each other. The first gear rotates along the first axis. The second gear rotates along the second axis. The first gear is arranged on one of the two headband connectors. The second gear is arranged on the corresponding earphone connector.

In an embodiment of the disclosure, a number of teeth of the first gear is less than a number of teeth of the second gear, so that a rotation angle of the headband component is greater than a rotation angle of the earphone component.

In an embodiment of the disclosure, the two headband connectors include two first sleeves, and the main body includes two second sleeves. The two first sleeves are respectively sleeved onto the two second sleeves. One of each of the first sleeves and the corresponding second sleeve includes a first chute, and the other one includes a first slide block. The first slide block slides along the first chute to drive the second sleeve to rotate relative to the first sleeve along the first axis, and drive the second sleeve to move relative to the first sleeve along the first axis.

In an embodiment of the disclosure, each of the driving modules is located in the corresponding first sleeve and on the first axis. Each of the driving modules is pivotally connected to the corresponding first sleeve along the first axis. The corresponding earphone connector includes a pivot part. The pivot part is pivotally connected to the driving module along the second axis.

In an embodiment of the disclosure, each of the first sleeves includes an arc-shaped groove. Each of the driving modules includes a cylinder extending along the first axis. The cylinder is located in the arc-shaped groove and is pivotally connected to the first sleeve.

In an embodiment of the disclosure, each of the first sleeves includes a first base plate. The arc-shaped groove is formed on the first base plate. Each of the second sleeves includes a second base plate located on the first base plate. Normal directions of the first base plate and the second base plate are parallel to the first axis, and the first base plate serves as a limiting surface of the second base plate.

In an embodiment of the disclosure, one of the second sleeves of the main body and the corresponding earphone connector includes a second chute, and the other one includes a second slide block slidably arranged on the second chute. An extension direction of the second chute is perpendicular to the first axis and the second axis.

In an embodiment of the disclosure, the second chute or the second slide block of the earphone connector is located between the pivot part and the corresponding sound emitting part.

In an embodiment of the disclosure, a distance of the earphone connector between the pivot part and an end far away from the sound emitting part is less than a radius of the second sleeve.

In an embodiment of the disclosure, the first gear and the second gear may be bevel gears or crown gears.

Based on the above, in the design of the head mounted display device of the disclosure, the two driving modules are respectively arranged between the two headband connectors and the two earphone connectors, so that when the two headband connectors rotate along the first axis, the two earphone connectors can be linked to the two headband connectors to respectively rotate along the two parallel second axes. In other words, when the user intends to wear the head mounted display device, by rotating the two headband connectors of the headband component, the two earphone connectors automatically rotate in the opposite directions to be far away from each other. Then, after the user adjusts the head mounted display device to a position convenient for wearing, the two headband connectors of the headband component may be rotated again to simultaneously rotate the headband component and the two earphone connectors to be close to the head and ears of the user, thereby reducing the steps for the user to wear the head mounted display device, so as to have better operation convenience.

In order for the features and advantages of the disclosure to be more comprehensible, the following specific embodiments are described in detail in conjunction with the accompanying drawings.

DETAILED DESCRIPTION OF DISCLOSED EMBODIMENTS

Figure 1:
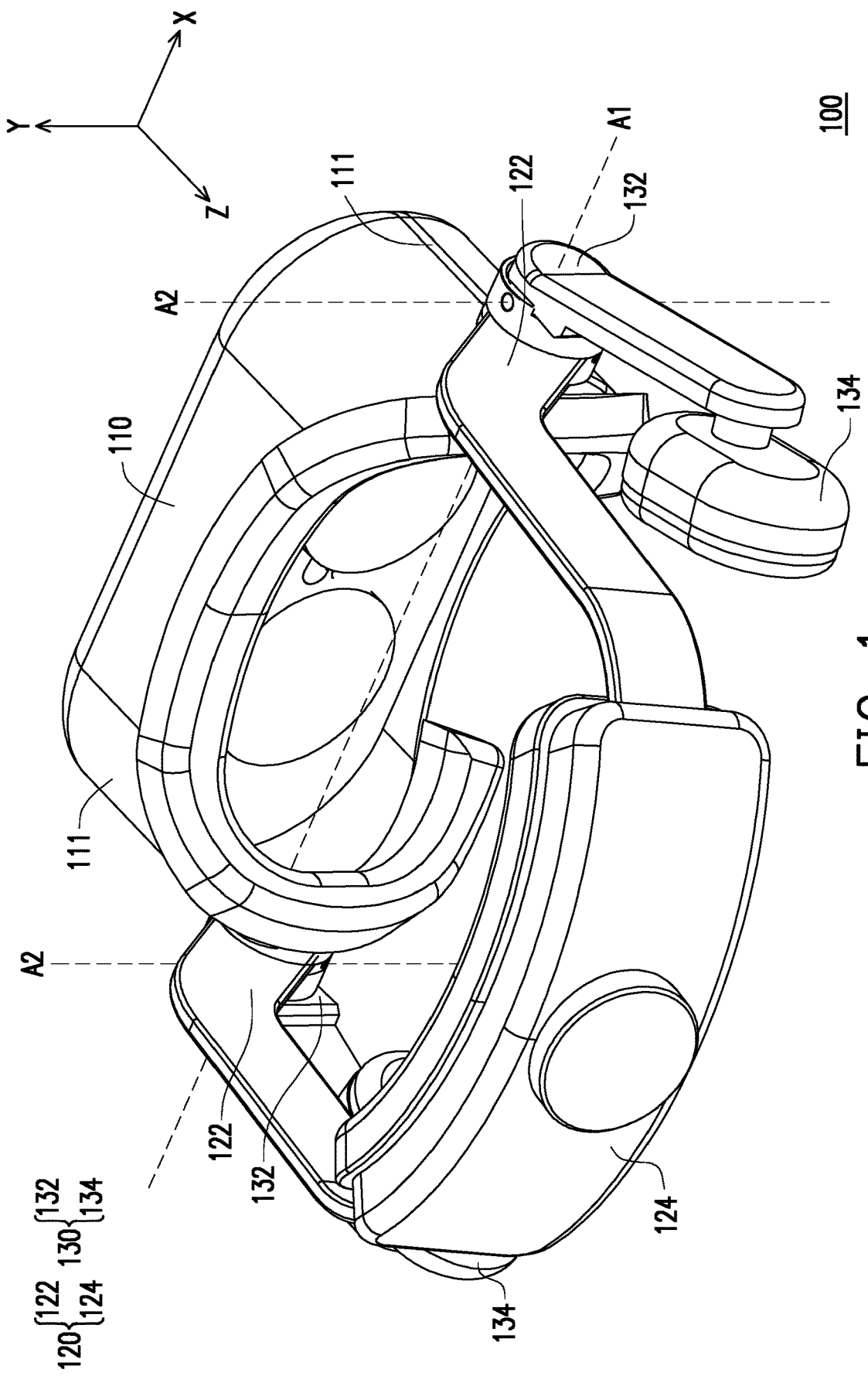
FIG. 1 is a schematic diagram of a head mounted display device in a first state according to an embodiment of the disclosure.
Figure 2:
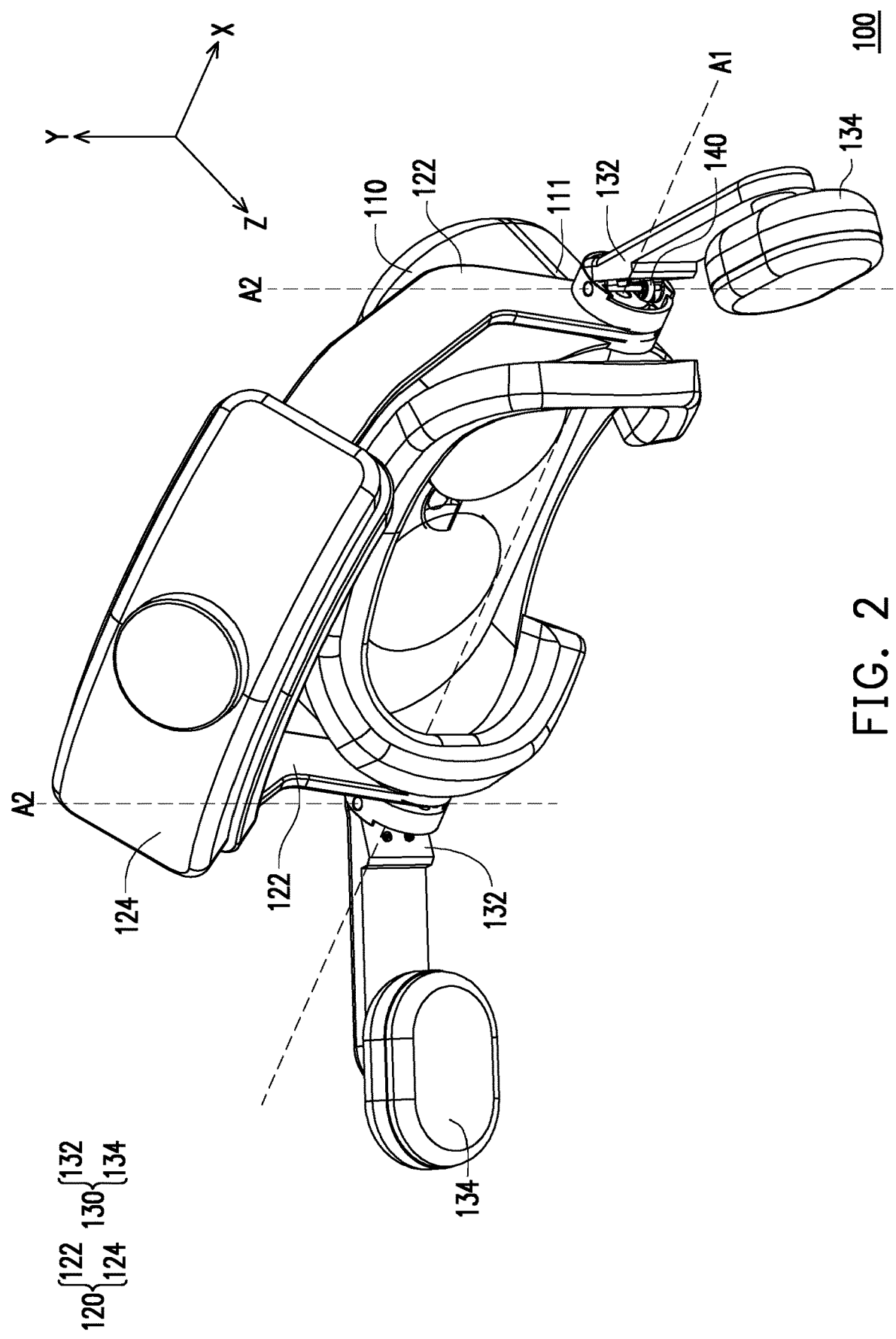
FIG. 2 is a schematic diagram of the head mounted display device of FIG. 1 in a second state.

FIG. 1 is a schematic diagram of a head mounted display device in a first state according to an embodiment of the disclosure. FIG. 2 is a schematic diagram of the head mounted display device of FIG. 1 in a second state. Cartesian coordinates X-Y-Z are provided here to facilitate subsequent descriptions of components. Please refer to FIG. 1 and FIG. 2. A head mounted display device 100 of this embodiment includes a main body 110, a headband component 120, two earphone components 130, and two driving modules 140.

In this embodiment, the headband component 120 includes two opposite headband connectors 122 and a headband centerpiece 124 connecting the two opposite headband connectors 122. The two earphone components 130 respectively include two earphone connectors 132 and two sound emitting parts 134 far away from the two earphone connectors 132. The two headband connectors 122 are respectively rotatably arranged on two opposite sides 111 of the main body 110 along a first axis A1 (parallel to the X-axis direction). The headband centerpiece 124 is suitable for contacting the back of the head of the user. The two earphone connectors 132 are respectively rotatably arranged on the two sides 111 of the main body 110 along two parallel second axes A2 (parallel to the Y-axis direction). The two earphone connectors 132 are located beside the two headband connectors 122 of the headband component 120.

It is worth mentioning that in the existing manners of wearing a head mounted electronic device with an earphone module, the user often needs to flip open the earphone module first to prevent the earphone module from blocking the wear on the head of the user, and adjust the earphone module to be next to the ears of the user after wearing the head mounted electronic device. Alternatively, the user needs to push open the earphone module with his head, so that the ears of the user are next to the earphone module. As such, the wearing manner of the head mounted electronic device with the earphone module is unintuitive and inconvenient, which causes poor user experience.

In order to prevent the above situation, in this embodiment, the two driving modules 140 are respectively arranged between the two headband connectors 122 and the two earphone connectors 132, and the two earphone connectors 132 are linked to the two headband connectors 122. When the two headband connectors 122 of the headband component 120 rotate relative to the main body 110 along the first axis A1, the two driving modules 140 drive the two earphone connectors 132 to rotate in opposite directions relative to the main body 110 along the two second axes A2, so that the two sound emitting parts 134 are close to each other to be in the first state (FIG. 1) or are far away from each other to be in the second state (FIG. 2).

In other words, in this embodiment, when the user intends to wear the head mounted display device 100, by rotating the two headband connectors 122 of the headband component 120, the two earphone connectors 132 automatically rotate in the opposite directions to be far away from each other (that is, transition from the first state of FIG. 1 to the second state of FIG. 2). Then, after the user adjusts the head mounted display device 100 to a position convenient for wearing, the two headband connectors 122 of the headband component 120 may be rotated again to simultaneously rotate the headband component 120 and the two earphone connectors 132 to be close to the head and ears of the user (that is, transition from the second state of FIG. 2 to the first state of FIG. 1), so that the user can complete the wearing of the head mounted display device 100 by a single action of rotating the two headband connectors 122, thereby reducing the steps for the user to wear the head mounted display device 100.

Figure 3:
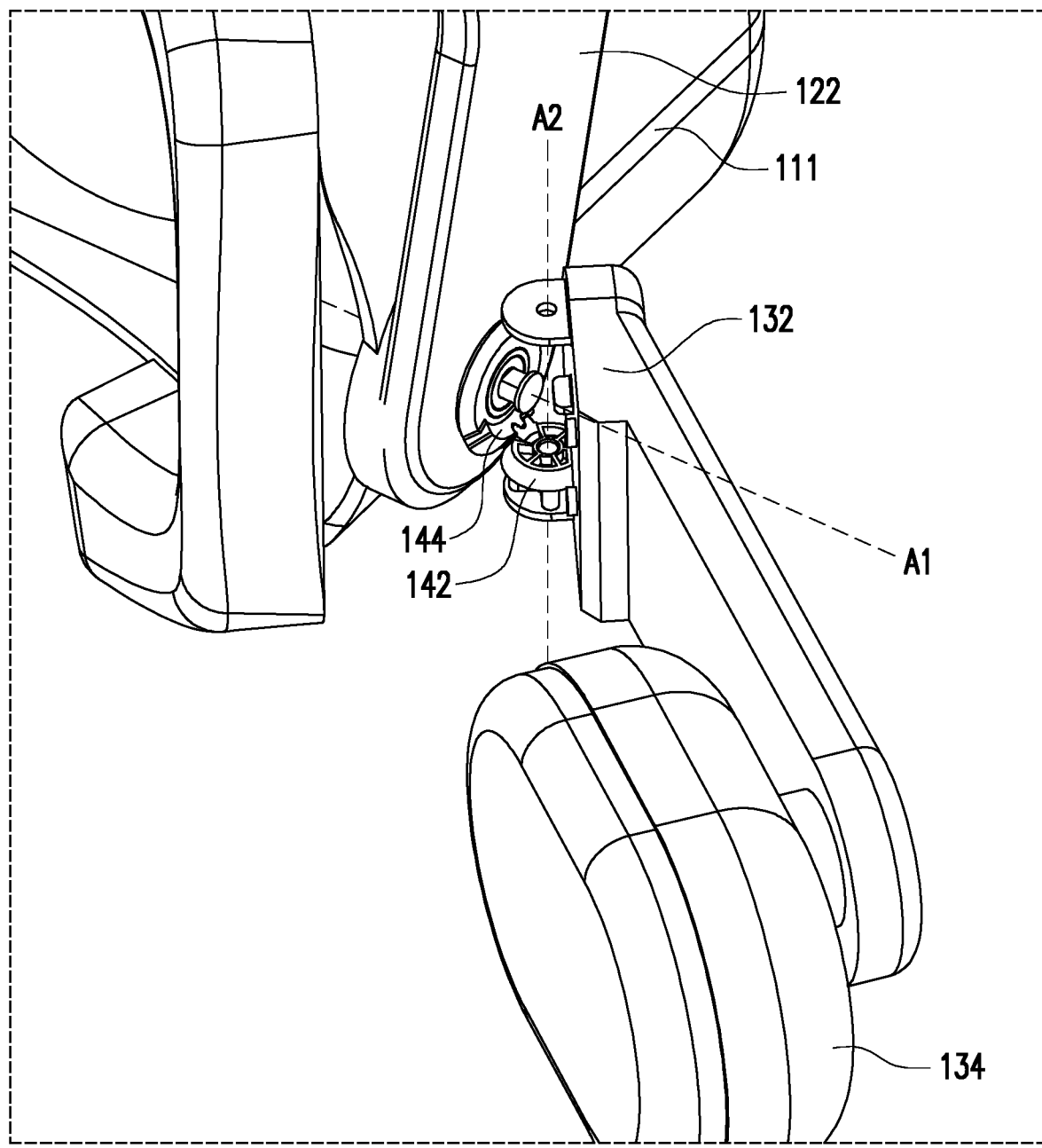
FIG. 3 is a partially enlarged schematic diagram of the head mounted display device of FIG. 1 in the second state.

FIG. 3 is a partially enlarged schematic diagram of the head mounted display device of FIG. 1 in the second state. Here, it should be noted that FIG. 3 omits the illustration of some components to clearly show the driving module 140. In addition, the driving module 140 is not limited to using bevel gears or crown gears for driving, and the following technical content uses the bevel gears as an explanation of this embodiment. Please refer to FIG. 3. In this embodiment, each driving module 140 includes a first bevel gear 142 and a second bevel gear 144 meshed with each other. The first bevel gear 142 is arranged on the headband connector 122, and the second bevel gear 144 is arranged on the corresponding earphone connector 132.

In this embodiment, the first bevel gear 142 rotates along the first axis A1, and the second bevel gear 144 rotates along the second axis A2. When the two headband connectors 122 of the headband component 120 rotate relative to the main body 110 along the first axis A1, the first bevel gear 142 arranged on the headband connector 122 rotates. At this time, the second bevel gear 144 meshed with the first bevel gear 142 is driven by the first bevel gear 142 to rotate along the second axis A2, so that the earphone connector 132 rotates along the second axis A2.

In addition, in this embodiment, since the distance between the back of the head of the user and the headband component 120 is greater than the distance between the ear of the user and the earphone component 130, the number of teeth of the first bevel gear 142 is less than the number of teeth of the second bevel gear 144. Also, the rotation angle of the headband component 120 is greater than the rotation angle of the earphone component 130, so that the user may wear the head mounted display device 100 smoothly.

FIG. 4 to FIG. 7 are schematic diagrams of a driving mechanism applied to a head mounted display device according to another embodiment of the disclosure. It must be noted here that the driving module of the head mounted display device of the disclosure is not limited to bevel gears or crown gears for driving. In this embodiment, the head mounted display device, for example, drives with the driving mechanism of a first sleeve 123, a second sleeve 112, and a driving module 140A in FIG. 4 to FIG. 7. In addition, the sound emitting part 134 is omitted from the left end of the earphone connector 132A of FIG. 4 to FIG. 7. The driving mechanism of one of headband connectors 122A of the head mounted display device and the corresponding earphone connector 132A will be described below.

Please refer to FIG. 4 to FIG. 7 simultaneously. In this embodiment, the headband connector 122A includes the first sleeve 123, the main body 110A includes the second sleeve 112, and the driving module 140A is located in the first sleeve 123. The first sleeve 123 is sleeved onto the second sleeve 112. The first sleeve 123 and the second sleeve 112 respectively include a first chute 1231 and a first slide block 1121.

When the user rotates the headband connector 122A, the first slide block 1121 of the second sleeve 112 slides along the first chute 1231 of the first sleeve 123 to drive the second sleeve 112 to rotate relative to the first sleeve 123 along the first axis A1, and drive the second sleeve 112 to move along the first axis A1 to be close to the first sleeve 123 (FIG. 4) or far away from the first sleeve 123 (FIG. 5), so that the headband connector 122A can rotate and move relative to the main body 110A along the first axis A1.

Figure 6:
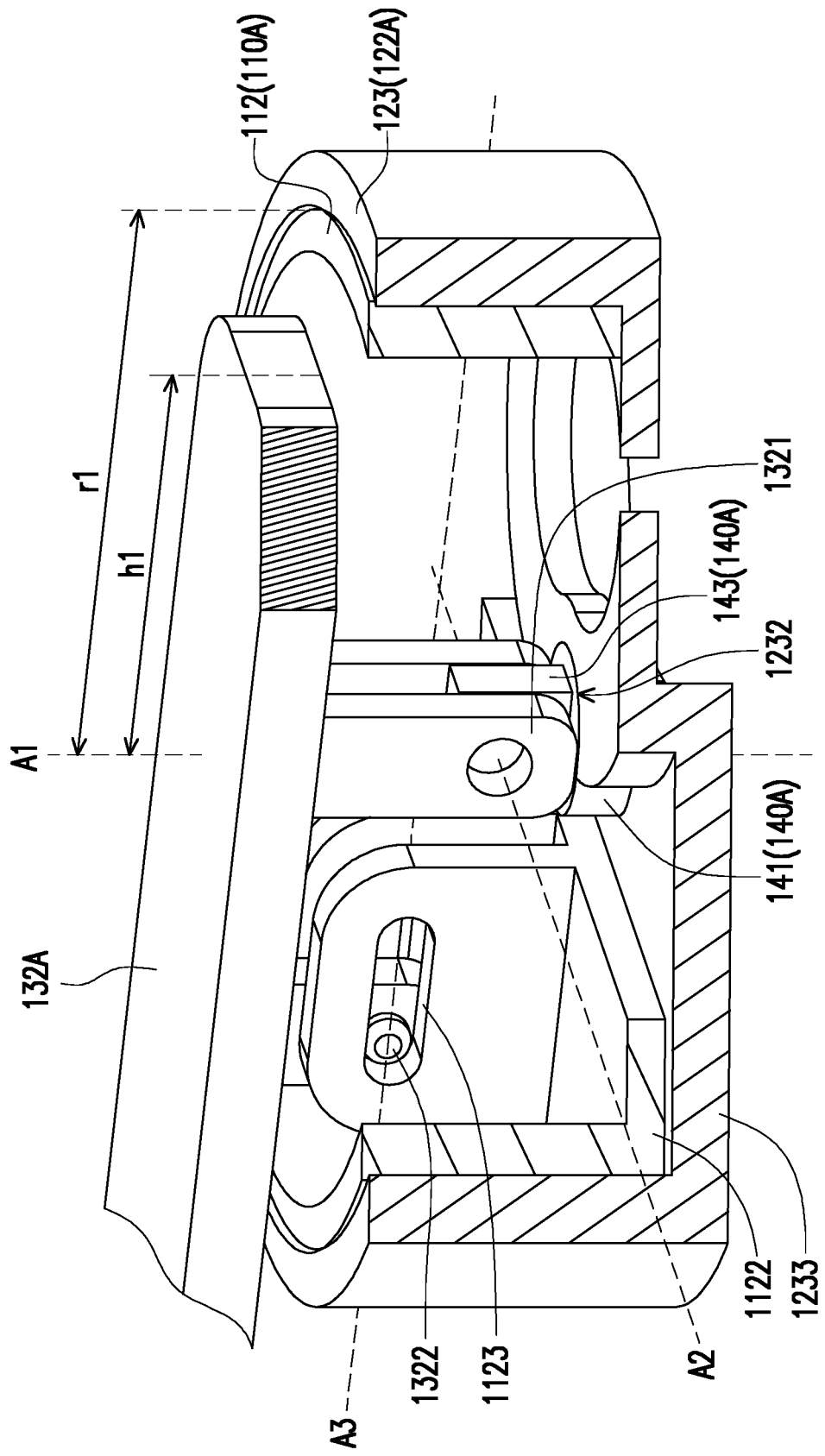
Figure 7:
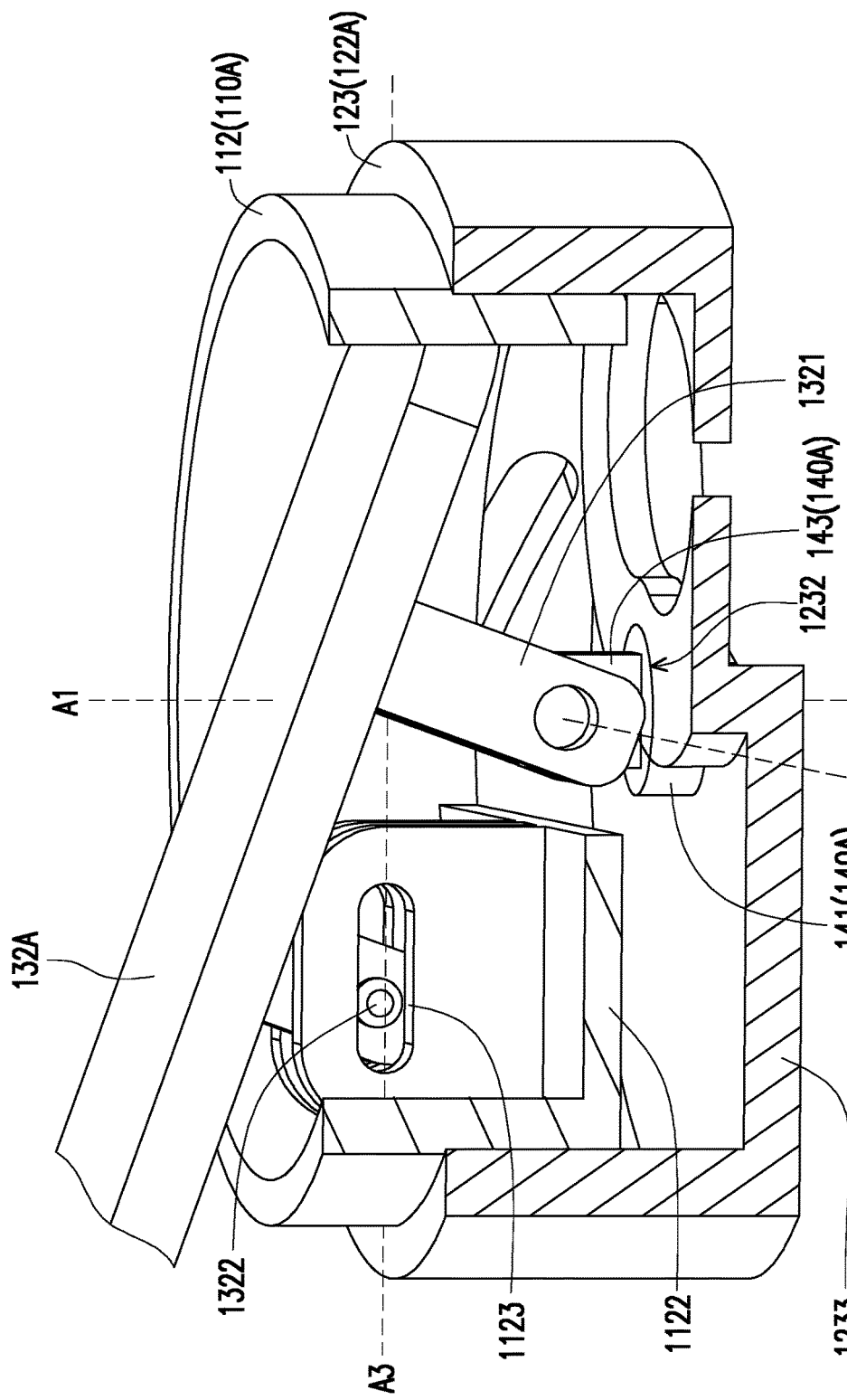

Please continue to refer to FIG. 6 and FIG. 7. In this embodiment, the driving module 140A is located in the first sleeve 123 and on the first axis A1, and the driving module 140A is pivotally connected to the first sleeve 123 along the first axis A1. In detail, the driving module 140A includes a cylinder 141 extending along the first axis A1. The first sleeve 123 includes a first base plate 1233, and an arc-shaped groove 1232 is formed on the first base plate 1233. The cylinder 141 is located in the arc-shaped groove 1232 and is pivotally connected to the first sleeve 123.

In this embodiment, a pivot part 1321 of the earphone connector 132A corresponds to the driving module 140A, and the pivot part 1321 is pivotally connected to the driving module 140A along the second axis A2. In detail, the driving module 140A further includes a pivot part 143. The pivot part 1321 of the earphone connector 132A corresponds to the pivot part 143 of the driving module 140A, and the pivot part 1321 of the earphone connector 132A is pivotally connected to the pivot part 143 of the driving module 140A along the second axis A2.

In addition, please refer to FIG. 4 to FIG. 7 simultaneously. In this embodiment, the second sleeve 112 includes a second base plate 1122. The normal directions of the first base plate 1233 and the second base plate 1122 are parallel to the first axis A1. The second base plate 1122 of the second sleeve 112 is located on the first base plate 1233 of the first sleeve 123. When the first slide block 1121 of the second sleeve 112 slides along the first chute 1231 of the first sleeve 123 to drive the first sleeve 123 to move along the first axis A1 to be close to the second sleeve 112 (that is, transition from the state of FIG. 5 and FIG. 7 to the state of FIG. 4 and FIG. 6), the first base plate 1233 serves as a limiting surface of the second base plate 1122, so that when the second sleeve 112 moves toward the first sleeve 123 along the first axis A1, the second sleeve 112 is limited to the first base plate 1233 of the first sleeve 123.

Please continue to refer to FIG. 6. In this embodiment, a second slide block 1322 of the earphone connector 132A is located between the pivot part 1321 and the corresponding sound emitting part 134 (not shown). The sound emitting part 134 is actually located at the left end of the earphone connector 132A of FIG. 4 to FIG. 7. A distance hl of the earphone connector 132A between the pivot part 1321 and an end far away from the sound emitting part 134 is less than a radius r1 of the second sleeve 112, so that the pivot part 1321 of the earphone connector 132A does not touch the second sleeve 112 when rotating along the second axis A2.

In addition, please refer to FIG. 4 to FIG. 7 simultaneously. In this embodiment, the second sleeve 112 of the main body 110A includes a second chute 1123. The earphone connector 132A includes the second slide block 1322 slidably arranged on the second chute 1123. An extension direction A3 of the second chute 1123 is perpendicular to the first axis A1 and the second axis A2.

Figure 4:
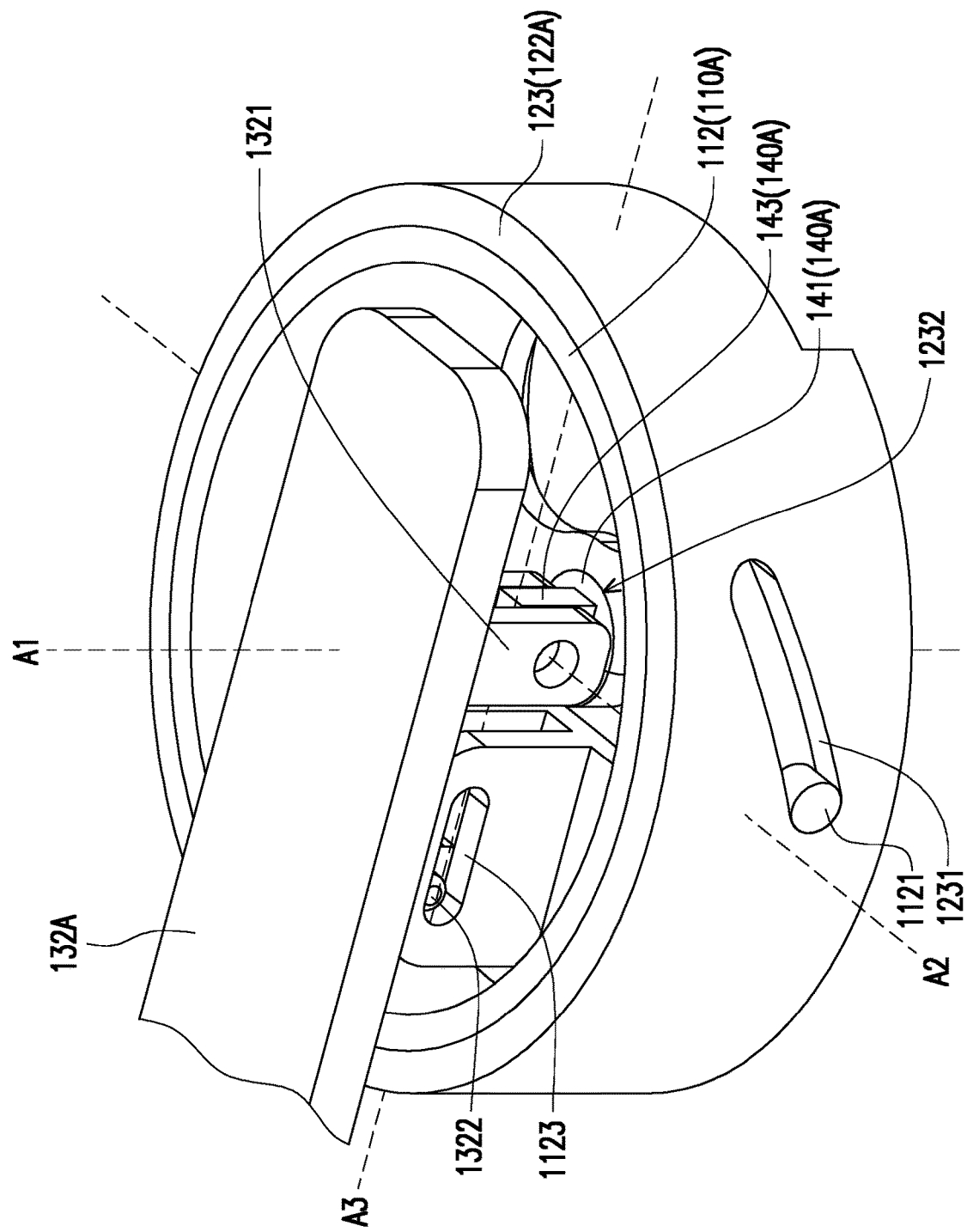
FIG. 4 to FIG. 7 are schematic diagrams of a driving mechanism applied to a head mounted display device according to another embodiment of the disclosure.
Figure 5:
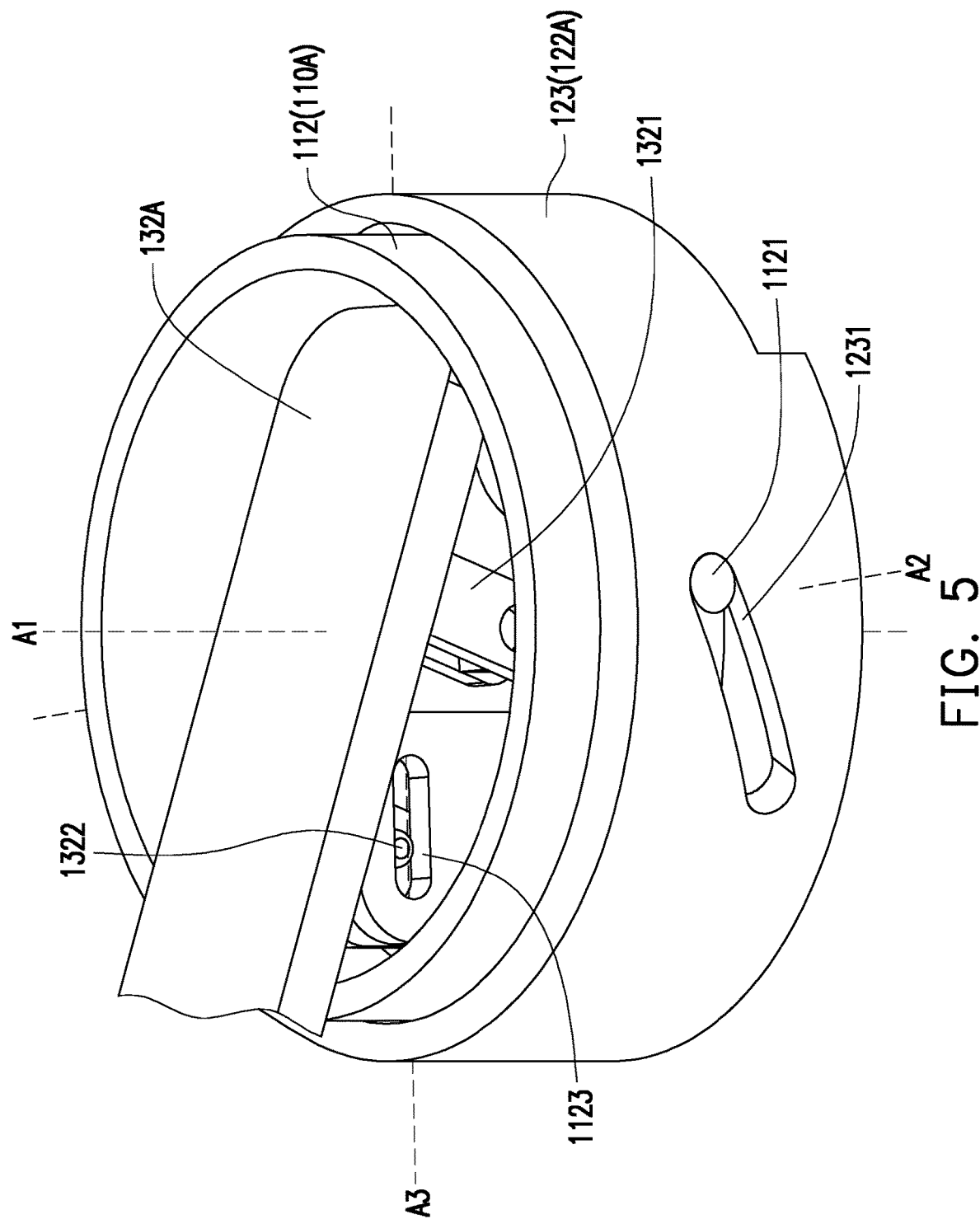

When the user intends to wear the head mounted display device, by rotating the headband connector 122A, the first slide block 1121 of the second sleeve 112 slides along the first chute 1231 of the first sleeve 123 as shown in FIG. 4 and FIG. 5 to drive the second sleeve 112 to move upward to be far away from the first sleeve 123 along the first axis A1. At this time, as shown in FIG. 6 and FIG. 7, the second slide block 1123 of the second sleeve 112 drives the second slide block 1322 of the earphone connector 132A to move far away from the first sleeve 123 along the first axis A1, and drives the second slide block 1322 of the earphone connector 132A to move rightward to be close to the pivot part 1321 along the extension direction A3, so that the pivot part 1321 of the earphone connector 132A rotates clockwise along the second axis A2 (that is, transition from the state of FIG. 4 and FIG. 6 to the state of FIG. 5 and FIG. 7).

Then, after the user adjusts the head mounted display device to a position convenient for wearing, the headband connector 122A may be rotated again to slide the first slide block 1121 of the second sleeve 112 along the first chute 1231 of the first sleeve 123 as shown in FIG. 5 and FIG. 4 to drive the second sleeve 112 to move close to the first sleeve 123 along the first axis A1. At this time, as shown in FIG. 7 and FIG. 6, the second slide block 1123 of the second sleeve 112 drives the second slide block 1322 of the earphone connector 132A to move close to the first sleeve 123 along the first axis A1, and drives the second slide block 1322 of the earphone connector 132A to move leftward to be far away from the pivot part 1321 along the extension direction A3, so that the pivot part 1321 of the earphone connector 132A rotates counterclockwise along the second axis A2 (that is, transition from the state of FIG. 5 and FIG. 7 to the state of FIG. 4 and FIG. 6).

Therefore, in this embodiment, by the driving mechanism of the first sleeve 123, the second sleeve 112, and the driving module 140A, when the user rotates the headband connector 122A along the first axis A1, the earphone connector 132A may simultaneously rotate along the second axis A2, thereby driving the headband component 120 and the two earphone components 130 to simultaneously rotate to be close to the head and ears of the user, so that the user can complete the wearing of the head mounted display device by a single action of rotating the two headband connectors 122A.

In summary, the two driving modules are respectively arranged between the two headband connectors and the two earphone connectors, so that when the two headband connectors rotate along the first axis, the two earphone connectors can be linked to the two headband connectors to respectively rotate along the two parallel second axes. In other words, when the user intends to wear the head mounted display device, by rotating the two headband connectors of the headband component, the two earphone connectors automatically rotate in the opposite directions to be far away from each other. Then, after the user adjusts the head mounted display device to a position convenient for wearing, the two headband connectors of the headband component may be rotated again to simultaneously rotate the headband component and the two earphone connectors to be close to the head and ears of the user, thereby reducing the steps for the user to wear the head mounted display device, so as to have better operation convenience.

Although the disclosure has been disclosed in the above embodiments, the embodiments are not intended to limit the disclosure. Persons skilled in the art may make some changes and modifications without departing from the spirit and scope of the disclosure. The protection scope of the disclosure shall be defined by the appended claims.

What is claimed is:

1. A head mounted display device, comprising:
   a main body;
   a headband component, comprising two opposite headband connectors, wherein the two headband connectors are respectively rotatably arranged on two opposite sides of the main body along a first axis;
   two earphone components, respectively comprising two earphone connectors and two sound emitting parts far away from the two earphone connectors, wherein the two earphone connectors are respectively rotatably arranged on the two sides of the main body along two parallel second axes, and the two earphone connectors are located beside the two headband connectors of the headband component; and
   two driving modules, respectively arranged between the two headband connectors and the two earphone connectors, wherein the two earphone connectors are linked to the two headband connectors, wherein
   when the two headband connectors of the headband component rotate relative to the main body along the first axis, the two driving modules drive the two earphone connectors to rotate in opposite directions relative to the main body along the two second axes, so that the two sound emitting parts are close to or far away from each other.

2. The head mounted display device according to claim 1, wherein each of the driving modules comprises a first gear and a second gear meshed with each other, the first gear rotates along the first axis, the second gear rotates along the second axis, the first gear is arranged on one of the two headband connectors, and the second gear is arranged on the corresponding earphone connector.

3. The head mounted display device according to claim 2, wherein a number of teeth of the first gear is less than a number of teeth of the second gear, so that a rotation angle of the headband component is greater than a rotation angle of the earphone component.

4. The head mounted display device according to claim 3, wherein the first gear and the second gear are bevel gears or crown gears.

5. The head mounted display device according to claim 2, wherein the first gear and the second gear are bevel gears or crown gears.

6. The head mounted display device according to claim 1, wherein the two headband connectors comprise two first sleeves, the main body comprises two second sleeves, the two first sleeves are respectively sleeved onto the two second sleeves, one of each of the first sleeves and the corresponding second sleeve comprises a first chute, the other one comprises a first slide block, and the first slide block slides along the first chute to drive the second sleeve to rotate relative to the first sleeve along the first axis, and drive the second sleeve to move relative to the first sleeve along the first axis.

7. The head mounted display device according to claim 6, wherein each of the driving modules is located in the corresponding first sleeve and on the first axis, each of the driving modules is pivotally connected to the corresponding first sleeve along the first axis, the corresponding earphone connector comprises a pivot part, and the pivot part is pivotally connected to the driving module along the second axis.

8. The head mounted display device according to claim 7, wherein each of the first sleeves comprises an arc-shaped groove, each of the driving modules comprises a cylinder extending along the first axis, and the cylinder is located in the arc-shaped groove and is pivotally connected to the first sleeve.

9. The head mounted display device according to claim 8, wherein each of the first sleeves comprises a first base plate, the arc-shaped groove is formed on the first base plate, each of the second sleeves comprises a second base plate located on the first base plate, normal directions of the first base plate and the second base plate are parallel to the first axis, and the first base plate serves as a limiting surface of the second base plate.

10. The head mounted display device according to claim 7, wherein one of each of the second sleeves of the main body and the corresponding earphone connector comprises a second chute, the other one comprises a second slide block slidably arranged on the second chute, and an extension direction of the second chute is perpendicular to the first axis and the second axis.

11. The head mounted display device according to claim 10, wherein the second chute or the second slide block of the earphone connector is located between the pivot part and the corresponding sound emitting part.

12. The head mounted display device according to claim 7, wherein a distance of the earphone connector between the pivot part and an end far away from the sound emitting part is less than a radius of the second sleeve.

* * * * *